Patented June 30, 1936

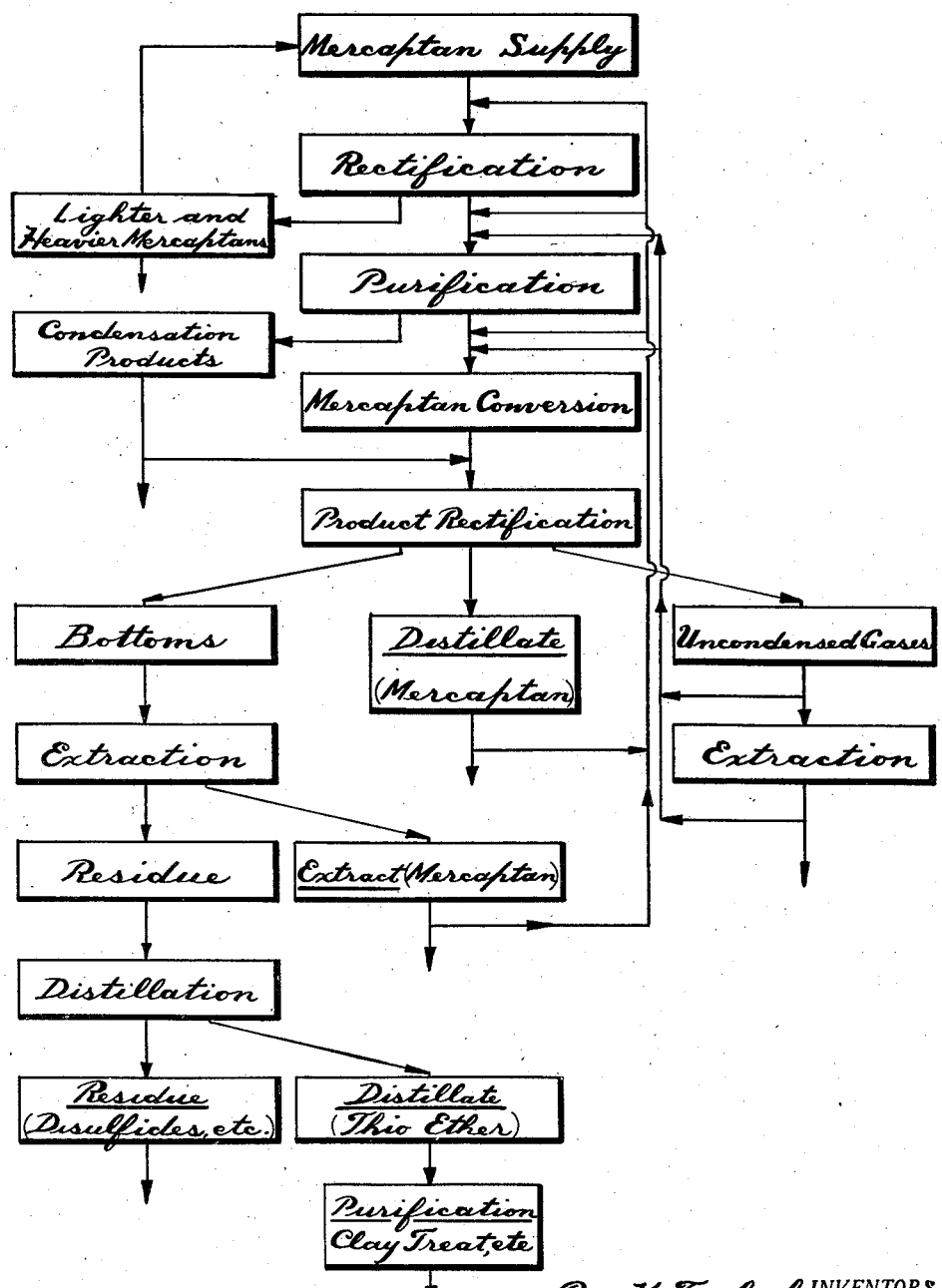

2,045,766

UNITED STATES PATENT OFFICE 2,045,766

MERCAPTAN CONVERSION

Per K. Frolich and Peter J. Wiezevich, Elizabeth, N. J., assignors to Standard Oil Development Company, a corporation of Delaware Application April 8, 1932, Serial No. 603,922

22 Claims. (Cl. 260—16)

This invention relates to the production, from mercaptans, of relatively higher molecular weight organic products by a catalytic process, and more especially to the production of relatively higher molecular weight mercaptans and other organic sulfur compounds. The reactions involved in producing these organic sulfur compounds may be represented as follows:

1. Higher mercaptans $2C_2H_5SH \rightarrow C_4H_9SH + H_2S$
2. Thio-ethers $2C_2H_5SH \rightarrow C_2H_5SC_2H_5 + H_2S$
3. Aldehydes $C_2H_5SH \rightarrow CH_3CHS + H_2$
4. Disulfides $2C_2H_5SH \rightarrow C_2H_5SSC_2H_5 + H_2$
5. Thio-esters $2C_2H_5SH \rightarrow CH_3C\underset{\underset{S}{\|}}{-}S-C_2H_5 + H_2$ The formation of higher mercaptans and thio-ethers from mercaptans as indicated in reactions 1 and 2 may be classified as dehydrunsulfing reactions, i. e. which involve removal of hydrogen sulfide. The formation of aldehydes, disulfides and thio-esters as indicated in reactions 3, 4 and 5 may be classified as dehydrogenation reactions. Products corresponding to those indicated in the above equations may be obtained by subjecting a mercaptan to suitable conditions of heat and pressure in the presence of dehydrogenating and/or dehydrunsulfing catalysts.

Suitable dehydrunsulfing catalysts are described in the co-pending applications Ser. No. 585,156, filed January 6, 1932, by Seaman and Huffman, and Ser. No. 605,783 filed April 16, 1932, by Per K. Frolich. Among such catalysts may be mentioned substantially all the metallic sulfides, especially those of the heavy metals such as copper, mercury, tin, lead, chromium, tungsten, molybdenum, iron, cobalt and nickel. The sulfides may be used alone or in admixture with each other or with other suitable sulfides such as those of cadmium, strontium, barium and aluminum. The stability of these catalysts may be aided by distributing them upon activated carbon or other supports or by mixing them with alumina, chromic oxide, magnesium axide potassium oxide or other suitable oxygen-containing compounds of the alkaline or earth metals and the metals of the VI group of elements.

Suitable dehydrogenation catalysts include those normally used for the production of esters from alcohols. Among the satisfactory catalysts is one composed of metallic oxides or sulfides mixed in suitable proportions. For example, the oxides or sulfides of the VI group metals, the metals of the iron group, or copper may be used in mixtures varying widely in composition. Other metals, oxides, or sulfides favoring dehydrogenation may be used in admixture with or in substitution for any of the above mentioned catalytic components. A relatively small amount of an oxide of the alkali or alkaline earth metals may also be added. Mixed dehydrogenating and dehydrunsulfing catalysts may also be used.

While both alkyl and aryl mercaptans may be used in this process, the relatively low molecular weight mercaptans obtained from petroleum oils such as sour cracked naphthas are especially suitable. These mercaptans may be readily separated from naphthas and other hydrocarbon oils by washing with an aqueous caustic solution and subsequently distilling the mercaptans from this solution with steam. The product thus obtained constitutes a rather complex mixture of mercaptans which consists primarily of methyl, ethyl, propyl, and butyl mercaptans. This product may be used directly as a feed stock in the herein disclosed process. However, it may be desirable to use as a feed stock a distillate fraction boiling within a range of about 25 to 50° C., as optimum conditions of operation may vary slightly with increasing boiling points of the mercaptans used. For example, the fractions boiling below 50° C., between 50 and 75° C., and above 75° C. may be used separately to advantage in the present process.

Regarding operating conditions, it is preferred to use a reaction temperature at which the mercaptans treated are substantially completely in vapor phase. The reaction temperature depends upon the activity of the catalyst used and on the time of contact, and should not be so high as to cause undue decomposition of the feed stock or product as by the formation of olefines or heavy polymers, or the formation of excessive amounts of fixed gases. The preferred reaction temperature generally is between about 300 and 450° C. but it may be lower or higher, depending upon the activity of the catalyst and other operating conditions; for example, temperatures from about 200 or 250° C. to 500° C. may be used under suitable operating conditions. Pressures above atmospheric are generally preferred because of their retarding effect on undesirable side reactions such as the formation of olefines and of gaseous decomposition products. Pressures of 10, 50, 100, 200 atmospheres or higher may be used and the more elevated pressures are preferred. The reaction vessel should be constructed of or lined with material resistant to the corrosive action of the reagents and products, especially to hydrogen sulfide and mercaptans.

The reaction is preferably conducted by passing vaporized mercaptans under suitable temperature and pressure conditions over a stationary solid catalyst. The reaction product is then cooled to condense out the normally liquid products and the uncondensed gaseous products may be recirculated over the catalyst with added mercaptans. These uncondensed gaseous products contain hydrogen sulfide, hydrogen, olefines, and mercaptan vapors. The mercaptan vapors may be recovered from these gases by rectification, or by scrubbing with an alkaline agent, or a hydrocarbon liquid such as naphtha, kerosene or gas oil.

It will be understood from the above description that it is possible by this catalytic operation to obtain at least three major products from a mercaptan; namely, higher mercaptan, ester, and disulfide, with twice the number of carbon atoms of the original mercaptan. The process is further complicated however both on account of the simultaneous occurrence of side reactions and because the new mercaptan formed is subject to the same catalytic changes as the one originally used as the raw material. Thus the butyl mercaptan formed from ethyl mercaptan will give rise to the formation of butyl aldehydes and to still higher esters, disulfides, mercaptans, etc. Although all these reactions proceed to some extent under reaction conditions favoring any one of them, a certain amount of selectivity may be obtained by varying the type of catalyst employed and by properly regulating the concentration of the reactants and products in the reaction zone. According to this method of operation it is possible to bring these more or less haphazard reactions under control and to favor the production of one particular compound or at least of one particular type of compounds.

Products containing oxy-organic compounds, such as alcohols, oxygen-containing esters, aldehydes, ketones and the like, and mixed oxy and organic sulfur compounds such as thio-esters and the like, may be obtained by passing a mixture of steam and mercaptan over similar catalysts. Likewise alcohols may be introduced with the mercaptans fed to the reactor. Air and/or other oxidizing gases may also be supplied to the reaction zone in limited amounts, and aid especially in the production of disulfides by dehydrogenation of mercaptans.

In this process the starting material may consist of a lower mercaptan in admixture with water vapor, carbon monoxide, or hydrogen, according to the products desired. For example, if it is desired to suppress aldehyde, ester and disulfide formation and to favor the production of higher mercaptans and/or thio-ethers, hydrogen may be introduced with the lower mercaptan into the reaction zone. The increased partial pressure of hydrogen reduces the tendency for dehydrogenation to aldehyde without however interfering with the condensation to thio-ethers or higher mercaptans, the net result being that thio-ethers and higher mercaptans rather than aldehydes and esters predominate in the product. It is desirable at the same time to use a catalyst which favors dehydrunsulfing rather than dehydrogenation. To further facilitate the formation of higher mercaptans and thio-ethers, carbon monoxide may be introduced with the reaction mixture in which case the hydrogen sulfide formed during the condensation is removed according to the reaction

Since this reaction produces hydrogen it is obviously possible, when carbon monoxide is used, to accomplish the same result with respect to the suppression of aldehyde and ester formation with less hydrogen in the initial gas mixture.

Conversely it is possible to reduce the formation of thio-ethers and higher mercaptans and thereby favor aldehyde and ester formation by introducing hydrogen sulfide with the mercaptan. Dehydrogenating catalysts are also preferred.

The concentration of hydrogen and hydrogen sulfide in the reaction mixture may be controlled as desired by proper regulation, treatment and recirculation of the uncondensed gaseous reaction products. Additional hydrogen or hydrogen sulfide above that available in the recirculated gases may of course be added if desired. It is also generally desirable to maintain an appreciable concentration of say 10 to 30% of gaseous olefines in the recirculated gases as the presence of olefines may, depending upon the conditions of operation, exert a retarding effect upon olefine-formation by the splitting of hydrogen sulfide from a single mercaptan molecule.

The following examples illustrate methods under which the herein disclosed process may be conducted.

1. A sour cracked gasoline is washed with aqueous caustic soda. The resulting aqueous layer is then distilled with steam and a distillate containing an oily layer of mercaptans insoluble in water is obtained. These mercaptans are redistilled and the fraction distilling between 30 and 50° C. is separately recovered. This fraction is passed at 250° C. over active carbon. It is then cooled to 50° C. and a small amount of oily condensate forms and is separately removed. The remaining uncondensed vapors are then passed at a temperature of 350° C. over a catalyst consisting of one part of cadmium sulfide, one part zinc sulfide and one part activated charcoal. The product is then cooled to atmospheric temperature and a liquid product is obtained which consists largely of thio-ethers. The uncondensed gases obtained consist primarily of hydrogen, hydrogen sulfide, and olefines.

2. The process described in Example 1 is conducted under the same conditions shown therein except that gaseous reaction products in sufficient amount to maintain the total feed in vapor phase are recirculated with added mercaptans over the catalyst at a reaction pressure of about 100 atmospheres. The liquid product contains a mixture of higher mercaptans, thio-esters, thio-ethers and poly-sulfides with some unreacted lower mercaptans which may be separated and reused in the process.

3. The process is conducted as described in Example 2 with the exception that the concentration of hydrogen sulfide in the recycled gas is maintained below about 5%. The resulting liquid product contains a larger proportion of thio-ethers and higher mercaptans, and a smaller amount of esters, than in Example 2.

4. The process is repeated according to Example 2 with the exception that the concentration of hydrogen in the recycled gas is maintained below about 10%. The resulting product contains a larger proportion of thio-esters with lesser amounts of higher mercaptans, thio-ethers, poly-sulfides and the like.

The drawing is an illustration of a flow plan for the mercaptan conversion process with especial reference to the production of thio-ethers and disulfides. Various alternative procedures for the process flow plan and treatments of the products which may be desirable in connection with the various modifications of the mercaptan conversion process herein disclosed will be readily apparent. The mercaptan supply may consist of either a pure mercaptan or a mixture of mercaptans such as is secured from petroleum naphthas. Such mixtures are preferably distilled to secure a cut boiling within the range of 25 to 50° C. This cut is then purified by suitable means such as by passing the mercaptan vapor at an elevated temperature, insufficient to cause appreciable reaction of the mercaptan, over an active adsorbent such as activated carbon, decolorizing clays, etc., as shown in Example 1, above. The purification may also be conducted by treating the mercaptan vapor with an aqueous concentrated zinc chloride solution or by treatment in liquid phase with sulfuric acid, aluminum chloride and decolorizing clays, phenol and the like. The purified cut with or without addition of recirculated gases or other gases is passed at suitable temperatures and pressures through a reaction zone containing a suitable catalyst. The product from this zone is then cooled, preferably under rectifying conditions, and three fractions are secured. The least volatile or bottoms fraction contains mercaptan conversion products such as thio-ethers, disulfides and the like, and mercaptans. The mercaptans are removed by extraction with a suitable solution such as lead acetate, sodium plumbate, or an alkaline agent such as a caustic soda solution, triethanolamine and the like, and may be recovered from this solution by suitable means such as steam distillation. The recovered mercaptans may then be recirculated, preferably after rectification to remove heavier mercaptans, to the mercaptan conversion step.

The residue from this extraction step may then be fractionated by distillation by which the lighter thio-ethers are secured as a distillate and the less volatile disulfides and other organic sulfur compounds comprise the distillation residue.

The liquid distillate of the product rectification consists mainly of unconverted mercaptans which may be recirculated preferably after rectification and purification to the mercaptan conversion process.

The uncondensed gases consisting primarily of hydrogen, hydrogen sulfide, olefines and mercaptan vapors may be bled off or recirculated with suitable treatment to control the concentration of these components in the reaction zone. Any one or more of these components may be separately removed by suitable extraction methods from the gases and may be withdrawn or recirculated to the mercaptan conversion process.

The following catalysts are also mentioned as examples of those suitable for the above described process:

5. A catalyst containing 50% iron sulfide and 50% manganese sulfide is obtained by co-precipitation with hydrogen sulfide from an aqueous solution of the sulfates.

6. A catalyst containing 95 parts of cadmium sulfide, 5 parts of zinc sulfide and 95 parts of alumina is prepared by thoroughly mixing the co-precipitated sulfides with active alumina and sufficient water to make a stiff paste. The paste is then cut into blocks and dried.

7. A catalyst is prepared by mixing the oxides of zinc, manganese and chromium in equal molal proportions with sufficient water to make a stiff paste. This paste is passed through a pill machine and the resulting pellets are dried.

While the initial materials used in the preparation of catalysts suitable for this process have been described, it is understood that changes may occur in the composition of the catalyst during the process with the formation of higher or lower sulfides, oxides, etc. and that this invention includes the use of all such catalysts in whatever form they may exist during the process.

This process is especially suitable for the conversion of methyl mercaptan to ethyl mercaptan. The latter may then be converted to ethyl thio-ether, which is suitable for use in paints, varnishes, lacquers, rubber compositions, Grignard syntheses, in resin preparation, as a solvent for resins, and for many other purposes.

Where the mercaptans to be converted are secured from petroleum fractions it is generally preferable to subject them to an initial treatment for the removal of undesirable components or catalyst poisons.

Although the nature of the process and the reactions involved may be readily understood on the basis of the reaction mechanisms described herein, the invention is not to be limited to any theory or explanation of the steps involved or to any examples which are given solely for purpose of illustration, but only by the following claims in which we wish to claim all novelty insofar as the prior art permits.

We claim:

1. The process which comprises passing mercaptans at a reaction temperature over a dehydrunsulfing catalyst under sufficient pressure for substantial conversion into relatively higher molecular weight mercaptans and other organic sulfur compounds.

2. Process for the conversion of mercaptans into relatively higher molecular weight mercaptans and other organic sulfur compounds comprising passing a mercaptan at a reaction temperature and a pressure raised substantially above atmospheric over a dehydrunsulfing catalyst.

3. Process according to claim 2 in which the catalyst comprises a metal sulfide.

4. Process according to claim 2 in which the catalyst comprises a sulfide of a heavy metal.

5. Process according to claim 2 in which the mercaptan feed stock is composed of mercaptans derived from petroleum.

6. Process according to claim 2 in which the mercaptan feed stock comprises low molecular weight mercaptans extracted from sour petroleum naphthas with aqueous alkali.

7. Process for the conversion of mercaptans into relatively higher molecular weight mercaptans and other organic sulfur compounds comprising passing a mercaptan in vapor phase at a reaction temperature and a pressure substantially above atmospheric over a dehydrunsulfing catalyst.

8. Process for conversion of mercaptans into relatively higher molecular weight mercaptans and other organic sulfur compounds comprising passing a mercaptan in vapor phase at a temperature between the approximate limits of 250 and 500° C. and a pressure above about 10 atmospheres over a dehydrunsulfing catalyst.

9. Process according to claim 8 in which the uncondensed gaseous products are repassed over the catalyst with added mercaptan.

10. In the conversion of mercaptan into relatively higher molecular weight mercaptans and other organic sulfur compounds by passing said mercaptan at a reaction pressure and temperature over a dehydrunsulfing catalyst, an improvement favoring the production of higher mercaptans comprising conducting the reaction in the presence of added hydrogen.

11. In the production of relatively higher molecular weight mercaptans and other organic sulfur compounds by the catalytic dehydrogenation and dehydrunsulfing of lower molecular weight mercaptans at reaction temperatures and pressures, an improved method for decreasing the formation of higher mercaptans and increasing the proportion of esters in the product, comprising conducting the said reaction in the presence of added hydrogen sulfide.

12. The process for treating mercaptans, which comprises passing a mercaptan feed stock at reaction temperature over a catalyst of the class consisting of dehydrunsulfing and dehydrogenating substances in the presence of a low molecular weight decomposition product of mercaptans to favor the formation of high molecular weight reaction products.

13. Process according to claim 12, carried out in the presence of hydrogen sulfide.

14. Process according to claim 12, in which oxygen-containing compounds capable of supplying oxygen to the mercaptans are fed into the reaction zone along with the mercaptan feed stock, whereby mixed organic oxy-sulfur compounds are produced.

15. The process which comprises passing a mercaptan feed stock at reaction temperature over a dehydrunsulfing and dehydrogenating catalyst, removing from the reaction products higher mercaptans, thioethers, thio-aldehydes, polysulfides and thio-esters, and recycling uncondensed gases and unreacted raw material.

16. Process according to claim 15, in which the amount of olefines, hydrogen sulfide and hydrogen in the uncondensed gases is regulated before recycling, in order to control the proportion of higher mercaptans, thioethers, thio-aldehydes, polysulfides and thio-esters to be produced.

17. Process according to claim 15, carried out at a pressure above atmospheric.

18. Process according to claim 15, in which petroleum mercaptans are used as the original feed stock and in which said feed stock is purified before passing to the catalytic reaction zone.

19. Process for converting mercaptans into higher molecular weight mercaptans, which comprises passing a mercaptan feed stock at a reaction temperature over a dehydrunsulfing catalyst at a pressure substantially above atmospheric.

20. Process for converting mercaptans into relatively higher molecular weight thioethers, which comprises first converting said mercaptans into higher molecular weight mercaptans by subjecting them to heat treatment under pressure in the presence of a hydrunsulfing catalyst and then converting said higher molecular weight mercaptans into corresponding thioethers.

21. The process for the conversion of mercaptans into relatively higher molecular weight mercaptans and other organic sulfur compounds, which comprises purifying said mercaptans, then passing them at a reaction temperature and pressure over a dehydrunsulfing catalyst, subjecting the reaction products to rectification whereby three fractions are obtained, namely, uncondensed gases, a mercaptan distillate and heavier bottoms, recirculating at least part of the uncondensed gases to control the trend of the reactions in the reaction zone, recirculating the mercaptan distillate which comprises chiefly unconverted mercaptans, extracting the rectification bottoms to remove mercaptans, subjecting said mercaptans to rectification to remove higher molecular weight mercaptans and recycling the lower molecular weight mercaptans, and distilling the extraction residue whereby a thioether distillate and a polysulfide residue are obtained.

22. The process for treating mercaptans, which comprises subjecting them to catalytic reaction under sufficient pressure for substantial production of higher molecular weight organic sulfur compounds in the presence of a low molecular weight decomposition product of mercaptans to favor the formation of high molecular weight reaction products.

PER K. FROLICH.
PETER J. WIEZEVICH.